United States Patent [19]

Ahmed et al.

[11] 4,271,790
[45] Jun. 9, 1981

[54] METHOD OF HEATING WATER USING WIND ENERGY AND APPARATUS THEREFOR

[76] Inventors: Nazeer Ahmed; Myrna M. Ahmed, both of 17 Wedgewood Dr., Danbury, Conn. 06810

[21] Appl. No.: 96,894

[22] Filed: Nov. 23, 1979

[51] Int. Cl.³ .............................................. F22B 3/06
[52] U.S. Cl. .................................... 122/26; 126/247; 366/149
[58] Field of Search .................. 126/247, 387; 122/26; 366/144, 147, 149; 237/12.1; 290/44; 416/181, 128, 171, DIG. 4

[56] References Cited

U.S. PATENT DOCUMENTS

| | | | |
|---|---|---|---|
| 2,344,075 | 3/1944 | Beldimano | 122/26 |
| 3,198,191 | 8/1965 | Wyszomirski | 126/247 |
| 3,822,740 | 7/1974 | Hackett | 122/26 |

*Primary Examiner*—Carroll B. Dority, Jr.
*Assistant Examiner*—Robert J. Marett

[57] ABSTRACT

A vertical shaft, attached to a windmill, rotates inside a first container which has a highly viscous fluid contained in it. A first set of perforated ribs extend radially outwards from the shaft. A second set of perforated ribs extend radially inwards from the first container. The two sets of ribs are vertically staggered with respect to each other so that when the shaft rotates, the first set of ribs do not come into physical contact with the second set of ribs. As the shaft rotates, the shearing action between the two sets of ribs forces the viscous fluid through the perforations in the two sets of ribs. This results in a pressure drop between the entrance and exit end of each perforation. The pressure drop results in heat dissipation in the viscous fluid. The viscous fluid is thereby heated. A second vessel containing water surrounds the first vessel. Heat transfer occurs across the first vessel to the water, thereby raising its temperature. A projecting arm attached to the shaft dips in the water, and, while rotating with the shaft, increases the heat transfer from the viscous fluid to water.

6 Claims, 4 Drawing Figures

METHOD OF HEATING WATER USING WIND ENERGY AND APPARATUS THEREFOR

FIELD OF INVENTION

This invention relates to the heating of water using wind energy. More particularly, it relates to a method of heating water wherein the rotary motion of a shaft attached to a windmill is used to force a highly viscous fluid through a plurity of orifices. A viscous fluid, whose viscocity is greater than that of water, is contained in a first vessel which accommodates a shaft attached to a windmill. Projecting radially outwards and rotating with the shaft are a plurality of a first set of ribs. Attached to the first vessel and projecting radially inwards from it are a second set of ribs which are staggered with respect to the first set of ribs in a vertical plane so that when the shaft rotates the first set of ribs do not come in physical contact with the second set of ribs. Both sets of ribs have a series of small perforations through their thickness. As the windmill rotates the shaft, the first set of ribs tend to drag the viscous fluid with it whereas the second set of ribs tends to retard the motion of the viscous fluid. This shearing action forces the viscous fluid through the perforations in the two sets of ribs. A pressure drop between the inlet and exit ends of each perforation results. This pressure drop causes dissipation of heat in the viscous fluid thereby increasing its temperature. A second vessel containing water surrounds the first vessel. Heat is conducted across the first vessel from the viscous fluid to water and the water is thereby heated.

DESCRIPTION OF PRIOR ART

A method of heating water using wind energy is described in U.S. Pat. No. 4,115,027 granted to R. N. Thomas. In this method, a cylindrical brake drum coaxially surrounds a shaft attached to a windmill. A plurality of brake shoes are attached to the shaft so that their outer ends engage the cylindrical brake drum. As the windmill rotates the shaft, the brake shoes rub the brake drum, generating friction, and this friction heats the water which is contained in a vessel surrounding the brake drum.

The disadvantage of this method is that the frictional rubbing of the brake drum and the brake shoes causes wear requiring periodic replenishment of the drum and shoe surfaces. It is therefore advantageous to provide methods of heating water using wind energy where such friction and wear are avoided.

OBJECTIVES OF THIS INVENTION

The objectives of this invention are:
(a) To provide an improved method of heating water using wind energy where friction and wear of mating surfaces are avoided;
(b) To provide an improved apparatus for heating water using wind energy.

SUMMARY OF THE INVENTION

A vertical shaft, attached to a windmill, rotates inside a first container which has a highly viscous fluid in it. A first set of perforated ribs extend radially outwards from the shaft. A second set of perforated ribs extend radially inwards from the first container. The two sets of ribs are vertically staggered with respect to each other so that when the shaft rotates, the first set of ribs do not come into physical contact with the second set of ribs. As the shaft rotates, the shearing action between the two sets of ribs forces the viscous fluid through the perforations in the two sets of ribs. This results in a pressure drop between the entrance and exit end of each perforation. The pressure drop results in heat dissipation in the viscous fluid. The viscous fluid is thereby heated. A second vessel containing water surrounds the first vessel. Heat is conducted across the first vessel to the water thereby raising its temperature. A projecting arm attached to the shaft dips in the water, and, while rotating with the shaft, increases the heat transfer from the viscous fluid to water.

THE DRAWINGS

DETAILED DESCRIPTION

Figure 1:
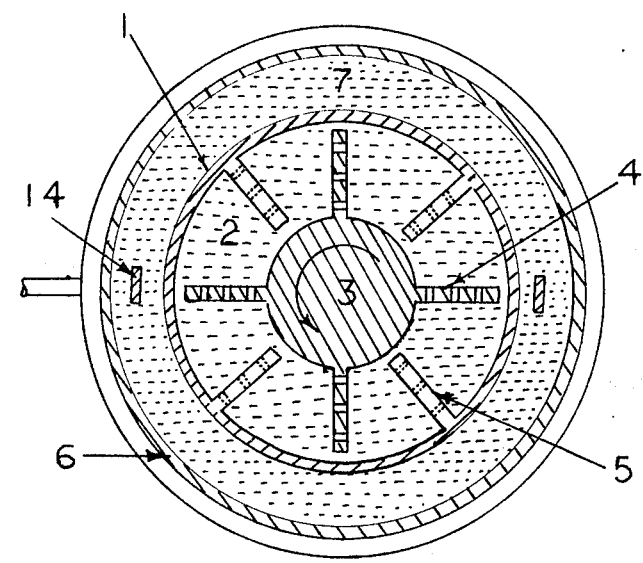
FIG. 1 shows two views of the apparatus for heating water using wind energy as conceived in the present invention.
Figure 1:
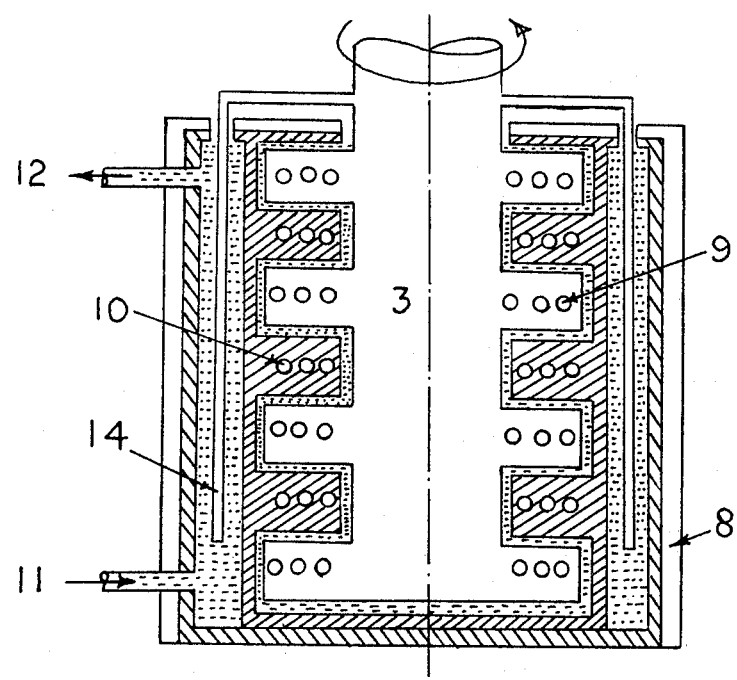

FIG. 1 shows two views of the apparatus as embodied in this invention. A first container 1 contains a viscous fluid 2. A drive shaft 3 is attached to a windmill and rotates with it. Projecting radially outwards from the drive shaft are radial arms 4. Projecting radially inwards from the first container are radial arms 5. The first and the second set of arms are staggered in a vertical plane so that when the shaft rotates, the two sets of arms do not touch each other. A second container 6, containing water 7, surrounds the first container. The water container is preferably insulated by insulation 8.

Radial arms 4 have perforations 9 in them. Radial arms 5 have perforations 10 in them. Water is fed into the second container 6 through an inlet 11 and is withdrawn through exit 12. Projecting arms 14 attached to the shaft rotate with it and stir the water.

As the shaft is driven by the windmill, radial arms 4 tend to drag the viscous fluid with them. This tendency is resisted by the stationary radial arms 5 attached to the first container. Consequently, the viscous fluid is subjected to a shearing action between layers attached to the first set of arms 4 and the second set of arms 5. This shearing action helps push the viscous fluid through the perforations in the two sets of arms. The viscous flow results in a pressure drop across each perforation. This pressure drop is dissipated in the viscous fluid resulting in a temperature increase in the viscous fluid. Heat is conducted across the first container from the viscous fluid to the water. Radial arms 14 stir the water and facilitate a more rapid heat transfer from the viscous fluid to the water by increasing heat transfer between the first container and water.

In this invention, the viscosity of the first fluid is greater than the viscosity of water. The greater the difference between the viscosities of the two fluids the more efficient is the generation of heat. However, the viscosity of the first fluid is not so great that it locks the shaft and prevents it from rotating.

Figure 2:
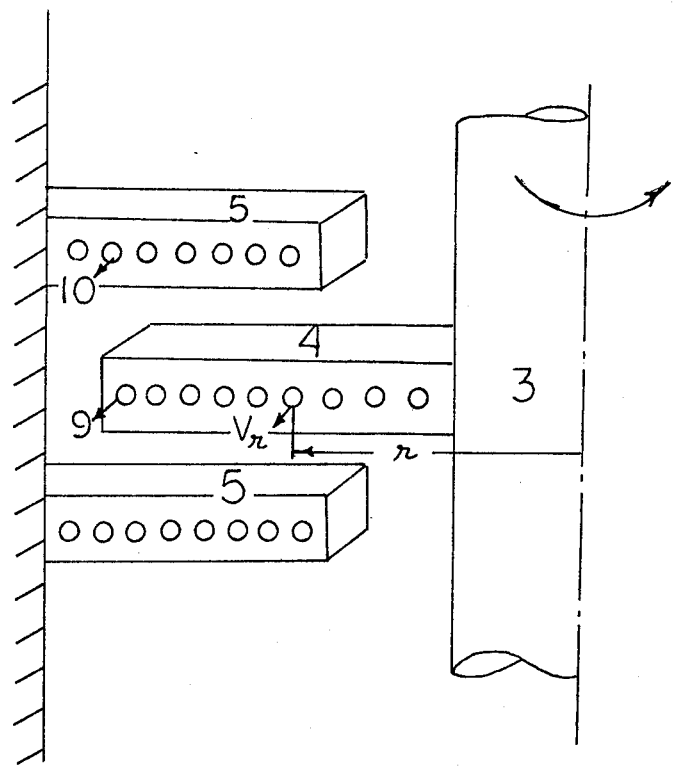
FIG. 2 shows a perforated radial arm attached to a rotating shaft, moving between two stationary perforated arms attached to a stationary vessel.

To illustrate the principle of heat generation according to this invention, attention is drawn to FIG. 2. This FIG. shows a rotating radial arm 4 containing perforations 9 and two stationary radial arms 5 containing perforations 10. If the viscous fluid in the first container were stationary, then, as the arm 4 rotates, the viscous fluid would pass through the perforations 9, such that the relative velocity between each perforation and the fluid is $v_r$, where $v_r$ is the velocity of the radial arm at that perforation. From geometry, $$v_r = r\omega$$

where $v_r$ = velocity of the radial arm at a perforation located at a radius r, $\omega$ = angular velocity of the rotating shaft. In practice, the viscous fluid is dragged along by the rotating arm 4 so that the relative velocity of the viscous fluid with respect to a perforation is less than $v_r$. If the viscous fluid were moving at the same radial velocity as the arm 4 then the relative velocity $v_r$ would be zero. In practice, the relative velocity is between these two bounds:

$$0 < v_r < \omega r.$$

The stationary arms 5 tend to impede the rotary motion of the viscous fluid thereby increasing the velocity of the viscous fluid passing through each orifice of the rotating arm 4. Conversely, some of the viscous fluid being dragged along by the rotating arm 4 is pushed through the orifices in the stationary arms 5. For the purpose of relative motion it is immaterial whether the arm is moving or the viscous fluid is moving. Therefore, the motion of the viscous fluid through perforations 10 in the stationary arms has the same effect as far as pressure drop is concerned, as the motion of the viscous fluid through the rotating arm 4, provided the relative velocity $v_r$ is the same in each case.

Figure 3:
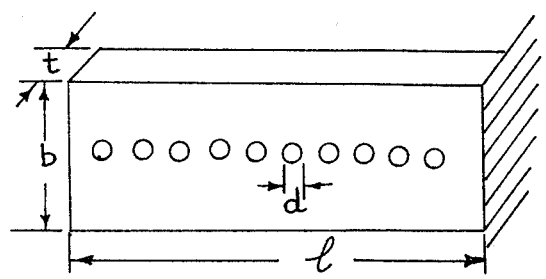
FIG. 3 shows a dimensioned perforated arm.

Attention is drawn to FIG. 3. Let t be the thickness of a radial arm 4. Let d be the diameter of an orifice. The pressure drop across the thickness t is given by (Reference: Fluid Mechanics, L. D. Landau and E. M. Lifshitz, Pergamon Press, 1975, p.57):

$$\Delta p = (16\mu \, t \, v_r/d^2) \quad (2)$$

Eq. (2) shows that the pressure drop $\Delta p$ (a) directly increases with respect to viscosity $\mu$;

(b) directly increases with respect to thickness t of the arms;

(c) directly increases with respect to angular velocity $\omega$ of the windmill rotor;

(d) is proportional to the location radius r of an orifice;

(e) is inversely proportional to the square of the diameter d of an orifice.

The temperature rise $\Delta T$ associated with a pressure drop $\Delta p$ is obtained from the principle of conservation of energy:

$$(\pi/4 \, d^2)(V_r)(\Delta p) = C_p \pi Q \Delta T.$$

which gives, $$\Delta T = (\Delta p \pi d^2/4 \, C_p \pi Q), \quad (3)$$

where $C_p$ is the specific heat of the viscous fluid, $\pi$ is the density of the viscous fluid, Q is the volume flow of the viscous fluid through a perforation.

The net increase in temperature in the viscous fluid is the sum total of the contribution from all perforations.

If the temperature of water in container 6 is $T_1$ then a thermal gradient $T_2-T_1$ is imposed across the first container. Due to this temperature gradient the heat transfer per unit area across the first container is given by:

$$H = C(T_2-T_1),$$

where C is a constant.

This heat transfer increases the water temperature and the warm water exits from exit 12.

It should be noted that the shearing action between the stationary radial arms attached to the stationary container, and the rotating radial arms attached to the rotating shaft, increases viscous dissipation of heat and assists in increasing the temperature of the viscous fluid.

EXAMPLE

For a 25 gallon water container we choose a container 1 made of copper or carbon steel, of dimensions one foot diameter and height three feet. The shaft diameter is three and a half inches. The outer container 6 is made of carbon steel, of dimensions 1½ (one and a half) feet diameter and height three feet, and is insulated on its exterior surfaces. The radial arms 4 are four inches long, 1¾ (one and three-fourths) inch deep and ¼ (quarter) inch thick. Four of these arms, 90 degrees apart, form one stack, and are located in one plane. Eight stacks of these are built on the shaft with a vertical distance (center-of-radial-arm to center-of-radial-arm) of four inches. The radial arms 5 are also four inches long, 1¾ (one and three-fourths) inch deep and ¼ (quarter) inch thick, four to a stack, 90 degrees apart. Seven of these (radial arms 5) are built onto the container 6, with a vertical distance (center-of-radial-arm to center-of-radial-arm) of four inches, and staggered when installed with respect to radial arms 4, so that the radial arms extending out from the rotor do not come in physical contact with the arms extending inwards from the stationary container 6. Each arm 4 contains six perforations, each one-eights inch in diameter, spaced radially half an inch apart. Similarly, each arm 5 contains six perforations each one-eights inch in diameter, spaced radially half an inch apart.

For the viscous fluid we choose SAE 70 petroleum lubricating oil whose viscosity at 0 degrees Fahrenheit is approximately $2 \times 10^6$ Centistokes and at 300 degrees Fahrenheit is approximately 10 Centistokes. (Reference: Kent's Mechanical Engineers Handbook, p 6-44, Wiley Handbook Series.)

The aforesaid description is for a preferred embodiment of this invention. Different combinations of perforation diameter, viscosity, arm dimensions and container material may be chosen in applying this invention.

In its application a water heater according to this invention may be used as a preheater in a house where the warm water exiting from an apparatus built as per this specification may be fed into a water boiler heated by conventional means.

The viscous oil used in this invention may either be a single phase fluid or a two phase mixture consisting of a liquid and a particulate solid suspended in the liquid. In such a two phase mixture the size of the particles of the second phase is smaller than the size of the orifices in the two sets of radial arms. Also, the melting point of the particulate solid is greater than the melting point of ice but less than the boiling point of water.

Figure 4:
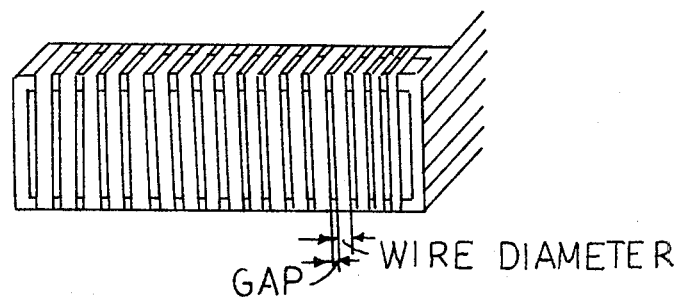
FIG. 4 shows a wire wound perforated arm.

The size of the perforations according to this invention is smaller than a second dimension of the radial arms. For example, referring to FIG. 3, if t is the thickness of these arms, b their width and l their length, the perforation diameter d is smaller than b. The lower limit on perforation diameter d is t/4 for arms of solid—as opposed to box-type—construction. For box-type construction, illustrated in FIG. 4, where a radial arm is built of a wire wound on a peripheral frame, the gap between successive wire windings is the size of the perforations, and the lower limit on this gap is one-fourth the diameter of the wire used for the winding.

What is claimed is:

1. A method of heating water using wind energy consisting of:
   (a) Attaching a shaft containing a first set of perforated radial arms to a windmill so that the shaft with its perforated radial arms rotates with the windmill;
   (b) Locating said shaft in a stationary first vessel which has a second set of perforated radial arms projecting inwards from it such that the first and second set of radial arms are staggered along an axis parallel to the axis of the said shaft, with no physical contact between first and second set of perforated radial arms as said shaft and said first set of perforated radial arms rotate with the windmill;
   (c) Locating a first fluid in said first vessel, the viscosity of said first fluid so chosen that it is higher than the viscosity of water at any temperature between the freezing point and boiling point of water;
   (d) Placing a second vessel with a water inlet and a water outlet such that the second vessel surrounds said first vessel;
   (e) Admitting water into said second vessel;
   (f) Attaching radial arms with stirrer means to the rotating shaft so that as the shaft rotates the stirrer means stir the water;
   (g) Utilizing wind energy to rotate said shaft with its first set of perforated radial arms thereby causing a relative motion between the first set of rotating perforated radial arms and the stationary second set of perforated radial arms, the relative motion forcing the first viscous fluid through the perforations in the two sets of radial arms, the motion of said first viscous fluid through each perforation resulting in a pressure drop across that perforation, the pressure drop resulting in heat generation in the first viscous fluid thereby increasing its temperature and resulting in a temperature differential between said first viscous fluid and water, which temperature differential causes a heat transfer to occur from said first viscous fluid to the water through said first container, thereby increasing the temperature of the water;
   (h) Drawing the water with increased temperature from said second vessel.

2. A method as described in claim 1 where said first viscous fluid consists of a mixture of two substances, a first substance whose melting point is between the freezing point and boiling point of water, and a second substance whose viscosity is greater than the viscosity of water at any temperature between the freezing point of water and the boiling point of water, said first substance suspended in particulate form in said second substance the particles sized so that they are smaller than the size of the perforations in the radial arms.

3. A method as described in claim 1 where the size of a perforation is not greater than a second dimension of a radial arm nor smaller than one quater of a third dimension of a radial arm, said second dimension defined as the intermediate dimension between the smallest dimension and the largest dimension of the radial arm in which the perforation is located, and said third dimension defined as the smallest dimension of the radial arm.

4. An apparatus for heating water using wind energy which consists of:
   (a) A shaft containing a first set of perforated radial arms projecting outwards from said shaft;
   (b) Said shaft located in a stationary first vessel which has a second set of perforated radial arms projecting inwards from it such that the first and second set of radial arms are staggered along an axis parallel to the axis of the said shaft, said first and second set of radial arms not touching each other as the shaft is rotated about its axis;
   (c) A first fluid located in said first vessel, the viscosity of the said fluid so chosen that it is higher than the viscosity of water at any temperature between the freezing point and boiling point of water;
   (d) A second vessel containing water and with a water inlet and a water exit, and located such that said second vessel surrounds said first vessel;
   (e) A radial arm with stirrer means attached to said shaft so that as the shaft is rotated the stirrer means stir the water;
   (f) Said shaft attached to a wind mill so that as the windmill rotates the shaft with its first set of perforated radial arms, a relative motion is set up between the first set of rotating perforated radial arms and the second set of stationary perforated radial arms, the rotary motion forcing the first viscous fluid through the perforations in the two sets of radial arms, the motion of said first viscous fluid through each perforation resulting in a pressure drop across that perforation, the pressure drop resulting in heat generation in the first viscous fluid thereby increasing its temperature and resulting in a temperature differential between said first viscous fluid and water, which temperature differential causes a heat transfer to occur from said first viscous fluid to the water through said first container, thereby increasing the temperature of the water in the second vessel, after which the warm water is drawn through the exit in the second vessel.

5. An apparatus as described in claim 4 where the size of a perforation is not greater than a second dimension of a radial arm nor smaller than one quarter of a third dimension of a radial arm, said second dimension defined as the intermediate dimension between the smallest dimension and the largest dimension of the radial arm in which the perforation is located, and said third dimension defined as the smallest dimension of the radial arm.

6. An apparatus as described in claim 4 where the size of a perforation is different from that of an adjacent perforation.

* * * * *